US012679030B2

(12) United States Patent
Wallace et al.

(10) Patent No.: US 12,679,030 B2
(45) Date of Patent: Jul. 14, 2026

(54) THERMAL BARRIER FOR TOOL PORT INTO HEATED BUILD CHAMBER OF 3D PRINTER

(71) Applicant: Stratasys, Inc., Eden Prairie, MN (US)

(72) Inventors: Luka Wallace, Lakeville, MN (US); James Flannigan, Mendota Heights, MN (US); Colin Schiel, Chaska, MN (US); Ross Michalkiewicz, Minneapolis, MN (US)

(73) Assignee: Stratasys, Inc., Minnetonka, MN (US)

( * ) Notice: Subject to any disclaimer, the term of this patent is extended or adjusted under 35 U.S.C. 154(b) by 58 days.

(21) Appl. No.: 18/829,950

(22) Filed: Sep. 10, 2024

(65) Prior Publication Data

US 2025/0083385 A1    Mar. 13, 2025

Related U.S. Application Data

(60) Provisional application No. 63/581,813, filed on Sep. 11, 2023.

(51) Int. Cl.
| | |
|---|---|
| *B29C 64/25* | (2017.01) |
| *B29C 64/106* | (2017.01) |
| *B29C 64/118* | (2017.01) |
| *B29C 64/209* | (2017.01) |
| *B29C 64/236* | (2017.01) |
| *B33Y 30/00* | (2015.01) |
| *B33Y 40/00* | (2020.01) |

(52) U.S. Cl.
CPC ............ *B29C 64/25* (2017.08); *B29C 64/106* (2017.08); *B29C 64/118* (2017.08); *B29C 64/209* (2017.08); *B29C 64/236* (2017.08); *B33Y 30/00* (2014.12); *B33Y 40/00* (2014.12)

(58) Field of Classification Search
CPC ...................................................... B29C 64/25
See application file for complete search history.

(56) References Cited

U.S. PATENT DOCUMENTS

| | | | |
|---|---|---|---|
| 2,220,939 | A | 11/1940 | Mcguire |
| 4,574,860 | A | 3/1986 | Weiss |
| | | (Continued) | |

FOREIGN PATENT DOCUMENTS

| | | |
|---|---|---|
| CA | 2190796 C | 7/2002 |
| EP | 1204517 A1 | 5/2002 |
| | (Continued) | |

OTHER PUBLICATIONS

International Search Report and Written Opinion for International Application No. PCT/US2024/046080, dated Dec. 11, 2024, 21 pages.

(Continued)

*Primary Examiner* — Benjamin A Schiffman

(74) *Attorney, Agent, or Firm* — Westman, Champlin & Koehler, P.A.

(57) ABSTRACT

A 3D printer includes an enclosed build chamber thermally separated from a tool chamber. An upward-facing tool tray coupled to or integral with a carriage has an open bottom providing a tool port for accessing the heated build chamber. A thermal barrier is mounted in the tool tray, covering the tool port but penetrable through an aperture thereof. The aperture provides an entry point to the build chamber for a working end of an active print head, wherein when the working end is positioned though the aperture, the tool port is substantially closed.

22 Claims, 14 Drawing Sheets

(56) References Cited

U.S. PATENT DOCUMENTS

| | | | |
|---|---|---|---|
| 5,312,224 | A | 5/1994 | Batchelder et al. |
| 5,764,521 | A | 6/1998 | Batchelder et al. |
| 5,866,058 | A | 2/1999 | Batchelder et al. |
| 6,192,642 | B1 * | 2/2001 | Colson .................... E04B 9/001 52/506.01 |
| 6,547,995 | B1 | 4/2003 | Comb |
| 6,722,872 | B1 | 4/2004 | Swanson et al. |
| 7,297,304 | B2 | 11/2007 | Swanson et al. |
| 7,891,964 | B2 | 2/2011 | Skubic et al. |
| 8,955,558 | B2 | 2/2015 | Bosveld et al. |
| 10,688,721 | B2 | 6/2020 | Swanson et al. |
| 11,485,079 | B2 | 11/2022 | Durand et al. |
| 11,858,214 | B2 | 1/2024 | Neal et al. |
| 12,552,099 | B2 * | 2/2026 | Houwing .............. B29C 64/236 |
| 2012/0164256 | A1 | 6/2012 | Swanson et al. |
| 2013/0078073 | A1 | 3/2013 | Comb et al. |
| 2013/0295513 | A1 | 11/2013 | Ferry |
| 2015/0096266 | A1 | 4/2015 | Divine et al. |
| 2017/0203506 | A1 * | 7/2017 | Hjelsand .............. B29C 64/106 |
| 2019/0210284 | A1 | 7/2019 | Bosveld |
| 2019/0240904 | A1 | 8/2019 | Swanson et al. |
| 2019/0322048 | A1 | 10/2019 | Huitema et al. |
| 2021/0205679 | A1 | 7/2021 | Moody, Jr. et al. |
| 2022/0001613 | A1 | 1/2022 | Chapman et al. |
| 2022/0314542 | A1 | 10/2022 | Neal et al. |

FOREIGN PATENT DOCUMENTS

| | | |
|---|---|---|
| WO | 0078519 A1 | 12/2000 |
| WO | 2016014543 A1 | 1/2016 |

OTHER PUBLICATIONS

Office Action from Chinese patent application No. 201690001742.9, dated Sep. 17, 2019.

Prosecution for U.S. Appl. No. 16/327,564, including: Advisory Action and AFCP Decision issued Jan. 18, 2022, 5 pages; Final Rejection issued Sep. 24, 2021, 14 pages; Non-Final Rejection issued May 21, 2021, 10 pages; Requirement for Restriction and Election issued Mar. 16, 2021, 9 pages; 38 pages total.

U.S. Patent Office issued prosecution for U.S. Application No. 17/221,136, filed Apr. 2, 2021, including: Notice of Allowance and Fee(s) Due issued Oct. 31, 2023; Final Rejection issued Aug. 17, 2023; and Non-Final Rejection issued Mar. 15, 2023; 30 pages total.

International Search Report and Written Opinion for International Application No. PCT/US2024/046080, dated Nov. 22, 2024.

FIG.1 is a photo of the prior art Stratasys Inc. Mojo 3D printer with top removed, dated Dec. 31, 2013.

FIG. 2 is a photo of the thermal barrier of the prior art Stratasys Inc. Mojo 3D printer, dated Dec. 31, 2013.

FIG. 3 is a photo of the thermal barrier of the prior art Stratasys Inc. Mojo 3D printer, dated Dec. 31, 2013.

FIG. 4 is a photo of the thermal barrier of the prior art Stratasys Inc. Mojo 3D printer, dated Dec. 31, 2013.

FIG. 5 is a photo of the thermal barrier of the prior art Stratasys Inc. Mojo 3D printer, dated Dec. 31, 2013.

FIG. 6 is a photo of the prior art Stratasys, Inc. Mojo 3D printer, dated Dec. 31, 2013.

International Search Report and Written Opinion dated May 17, 2017 for PCT/US2016/051297, filed Sep. 12, 2016.

U.S. Patent Office issued prosecution for U.S. Appl. No. 16/327,564, filed Feb. 22, 2019, including: Advisory Action and AFCP Decision issued Jan. 18, 2022, 5 pages; Final Rejection issued Sep. 24, 2021, 14 pages; Non-Final Rejection issued May 21, 2021, 10 pages; Requirement for Restriction and Election issued Mar. 16, 2021, 9 pages; 38 pages total.

U.S. Patent Office issued prosecution for U.S. Appl. No. 17/221,136, filed Apr. 2, 2021, including: Notice of Allowance and Fee(s) Due issued Oct. 31, 2023; Final Rejection issued Aug. 17, 2023; and Non-Final Rejection issued Mar. 15, 2023; 30 pages total.

* cited by examiner

THERMAL BARRIER FOR TOOL PORT INTO HEATED BUILD CHAMBER OF 3D PRINTER

CROSS-REFERENCE TO RELATED APPLICATION

The present application is based on and claims the benefit of U.S. provisional patent application Ser. No. 63/581,813, filed Sep. 11, 2023, the content of which is hereby incorporated by reference in its entirety.

BACKGROUND

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, selective laser sintering, powder/binder jetting, electron-beam melting, electrophotographic imaging, and stereolithographic processes.

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

High-temperature materials printed using material extrusion techniques are desirably extruded into a heated build chamber, a.k.a. a hot oven. There is a continued need for retaining heat in the build chamber to provide thermal separation and thermal efficiencies, and also to maintain stable build chamber temperatures.

SUMMARY

An aspect of the present disclosure relates to an extrusion-based 3D printer. The 3D printer includes an enclosed build chamber having a ceiling comprised of a y-axis deformable thermal insulator and through which an active print head accesses the build chamber to print parts by extruding material onto a platen and an x-y gantry mounted on top of the build chamber and having an x-bridge spanning the build chamber. A print head carriage includes a tool mount for removable installation of one or more print heads and configured for back-and-forth movement along the x-bridge, wherein the x-y gantry is configured to move the carriage in an x-y plane above the build chamber. The 3D printer includes an upward-facing tool tray coupled to or integral with the carriage and having an open bottom providing a tool port for accessing the heated build chamber and an x-axis deformable thermal insulator spanning a length of the x-bridge and coupled to opposite ends of the tray and or the carriage. A thermal barrier is mounted in the tool tray, covers the tool port and penetrable through an aperture thereof. The aperture provides an entry point to the build chamber for the working end of the active print head, wherein when the working end is positioned though the aperture, the tool port is substantially closed.

Another aspect of the present disclosure relates to a method of swapping tools during a print job in a 3D printer having a heated build chamber. The method includes providing an x-y gantry mounted on top of the build chamber and comprising a x-bridge spanning the build chamber, a print head carriage providing a tool mount for removable installation of one or more print heads and configured for back-and-forth movement along the x-bridge, wherein the x-y gantry is configured to move the carriage in an x-y plane above the build chamber, an upward-facing tool tray coupled to or integral with the carriage and having an open bottom providing a tool port for accessing the heated build chamber, an x-axis deformable thermal insulator spanning a length of the x-bridge and coupled to opposite ends of the tray and or the carriage so as to expand and contract with the back-and-forth movement of the carriage along the x-bridge, the x-axis deformable thermal insulator thereby covering a portion of the build chamber and forming part of the ceiling, wherein the x-axis thermal barrier comprises an aperture configured to expand as a working end of a first print head passes therethrough and configured to contract about the print head once the working end passes through the thermal barrier. The method includes moving the working end of the first print head through the thermal barrier, thereby causing the tool port to be substantially closed. The method includes lifting the first print head from the heated build chamber by passing the working end through the thermal barrier and once the working end is removed from the aperture for a tool swap, the aperture contracts to an area that is less than a maximum cross-sectional area of the working end.

DETAILED DESCRIPTION

Figure 1:
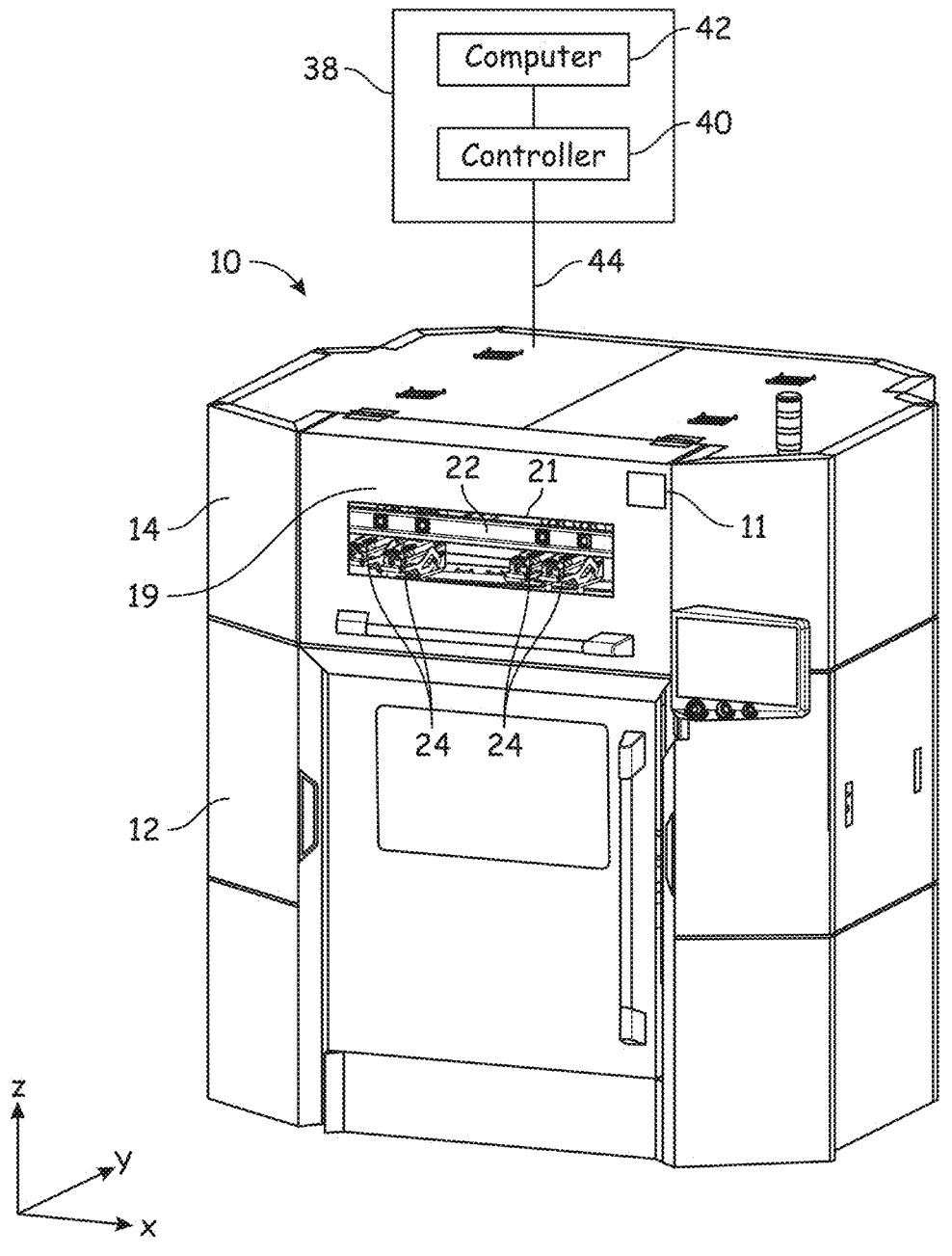
FIG. 1 is a perspective view of an extrusion-based 3D printer of the present disclosure having a heated build chamber positioned below a tool chamber.

The present disclosure relates to a 3D printer that provides thermal retention within a build chamber where material is extruded to print parts, and thermal isolation between the build chamber and other printer components (e.g., a tool chamber). The 3D printer includes thermal insulator components and a thermal barrier that substantially minimize thermal losses in areas where moving 3D printer components penetrate walls of the build chamber. The 3D printer includes a dynamic thermal insulator that allows for the movement of a tool carried on a gantry to access the heated build chamber, while substantially minimizing thermal losses, as the tool moves in XYZ directions. The definition of a tool is any device that can be used in the 3D printer including but not limited to a print head (also called an extruder), a material depositor, a shaping device, a roller, a focused heating device such as a laser or heater, focused cooling device, a carbon fiber deposition device, a monitoring device including but not limited to imaging devices and cameras, measurement devices including, but not limited to, lasers and touch probes or any other device that can measure distance, size or features of a part being printed.

The present disclosure is also directed to 3D printers having a heated build chamber and a separate tool chamber positioned above the heated build chamber. The tool chamber includes a tool rack for holding print heads and optionally, other build tools for use in constructing the part. The heated build chamber and the tool chamber are separated by a thermal insulator in a system which allows a nozzle of a print head to extend from the tool chamber into the heated build chamber for extruding material to build the part on the build platform. The thermal insulator forms a ceiling of the heated build chamber. A primary z positioner incrementally lowers the build platform within the heated build chamber as the part is constructed layer-by-layer by extruding material from an active print head onto the build platform.

The tool changer allows for switching between a plurality of different printing tools retained outside the heated print chamber. The hot ends or working ends of print heads and other tools are inserted into the heated chamber through a tool port for use in printing a 3D part, then removed when a tool change is commanded.

As the various hot ends of print heads are positioned into and removed from the heated build chamber, the tool port can serve as a large source of heat loss, particularly as print head size increases and oven temperature requirements are hotter. The present disclosure includes a thermal barrier for covering the tool port. The thermal barrier aids in retaining heat that would otherwise escape from the heated build chamber through the tool port. An aperture of the thermal barrier conforms to the shaft of the inserted print head hot end, which is in some cases narrower than a nozzle tip of the hot end. The thermal barrier also aids in retaining heat within the heated build chamber by reducing or sealing the tool port or access point when no tool is inserted.

In some instances, the thermal barrier includes an inner flexible material such as, but not limited to an elastomeric silicone material that is covered with upper and lower layers of a low surface energy material such as, but not limited to, PTFE coated fiberglass. The thermal barrier has an opening from which slits radially extend to provide the flexibility required to pass working ends of tools therethrough, while having the resilience to return to its relaxed, substantially flat state after the working ends pass therethrough. The opening is covered by material that connects the upper and lower layers of a low surface energy material, as well as the side edges contacting the tool, to minimize the force required to move the tool through the thermal barrier while protecting the inner flexible material of the thermal barrier from wear as the tool moves in the z direction.

In other instances, the thermal barrier includes is constructed of an elastomer that is resistant to elevated temperatures in the heated build chamber. The elastomer material is retained in tension and includes an opening through which a hot end of a print head or extruder or other tool is inserted to gain entrance to the heated build chamber. The opening then contracts about the tool above the working end to form a seal that substantially prevents leakage through an interface between the tool and the thermal barrier as the tool moves in the Z direction and/or is swapped for another tool.

Figure 2:
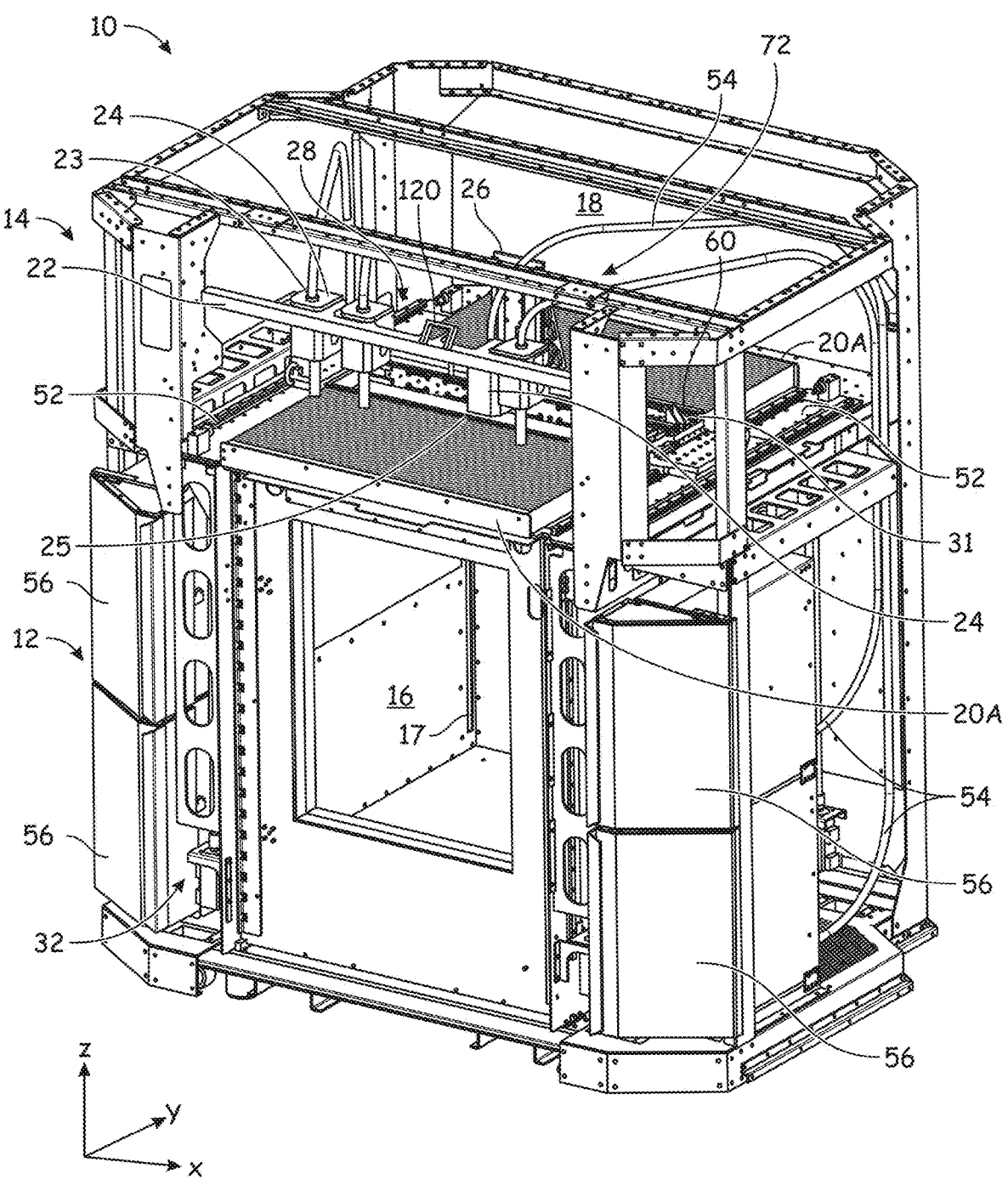
FIG. 2 is a perspective view of the 3D printer shown in FIG. 1, with portions of the frame or cabinet removed to illustrate separation of the build and tool chambers and other features in greater detail with an accordion pleated thermal insulator separating the build and tool chambers.
Figure 3:
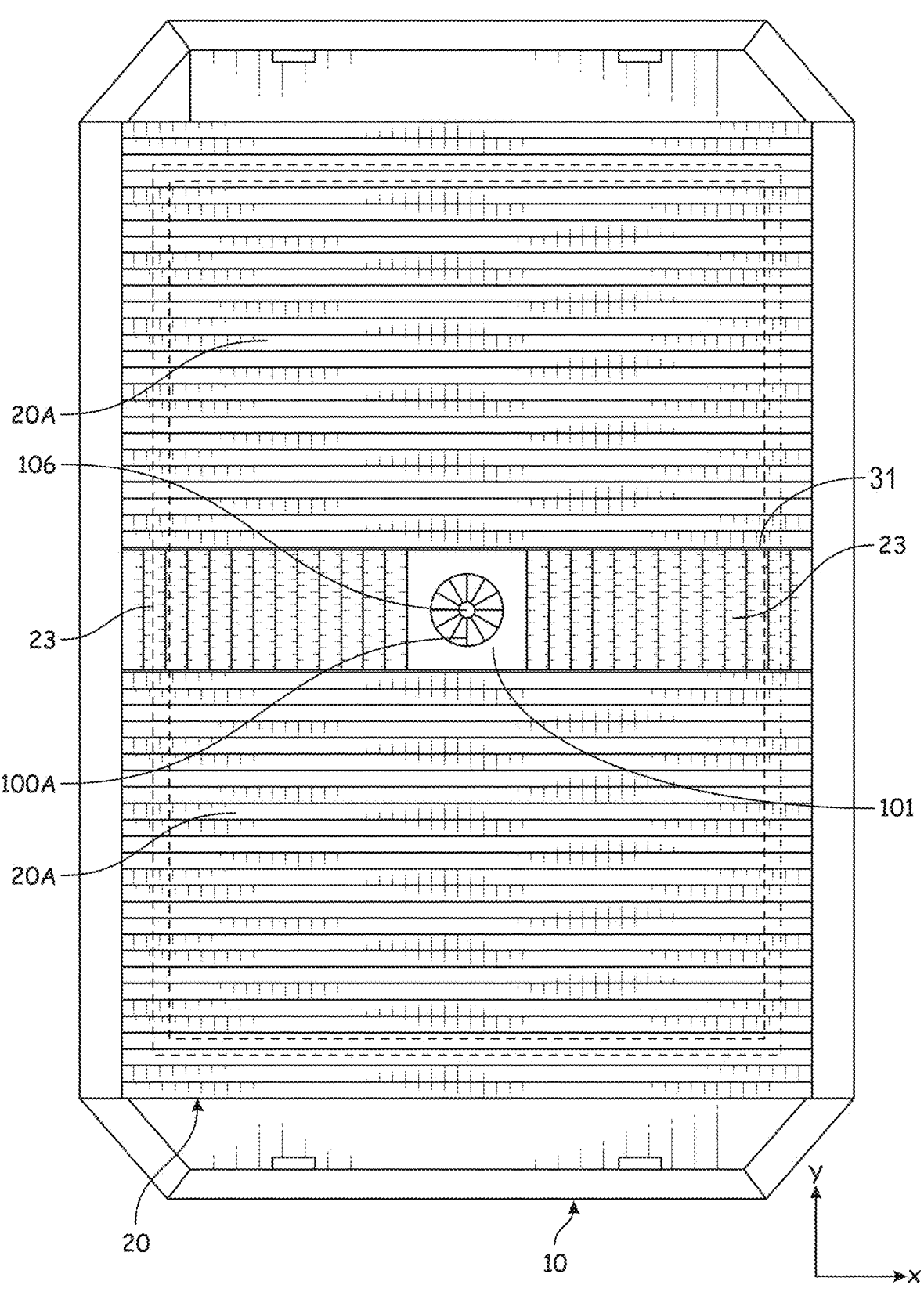
FIG. 3 is a top view of the accordion pleated thermal insulator of FIG. 2.
Figure 4:
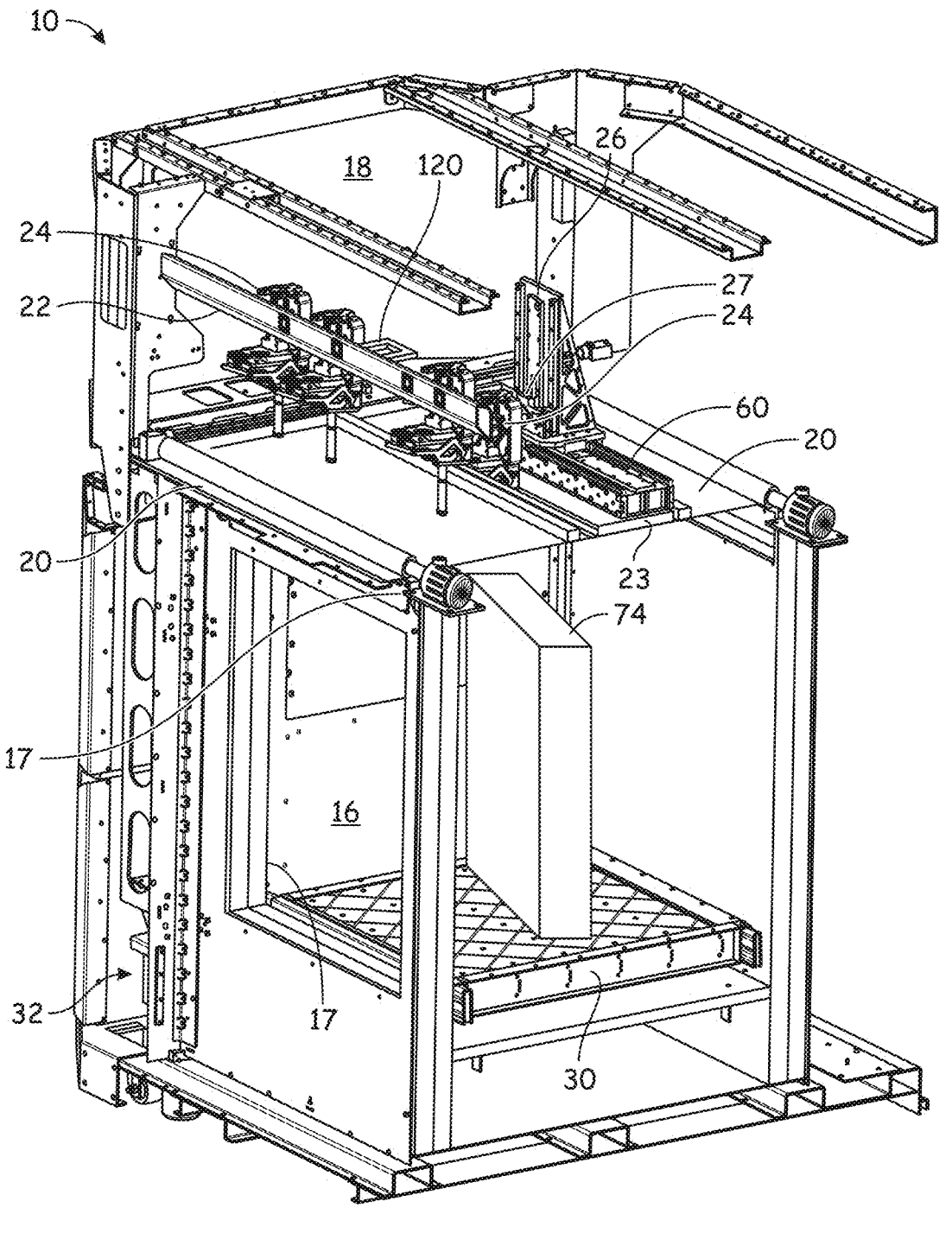
FIG. 4 is a view of the 3D printer shown in FIG. 1, illustrating filament spool cabinets, x-y gantry and local Z positioner features, and a roller thermal insulator separating the build and tool chambers.

The present disclosure may be used with any suitable additive manufacturing system, commonly referred to as a 3D printer. For example, FIGS. 1-5 illustrate a 3D printer 10 having features as discussed above. FIG. 1 is a perspective view of the 3D printer enclosed in cabinets. FIGS. 2-4 are perspective views or side views of the 3D printer with portions removed to illustrate internal features more clearly.

As shown initially in FIGS. 1 and 2, 3D printer 10 includes a build chamber cabinet 12 housing a heated build chamber 16 and a tool chamber cabinet 14 housing a separate tool chamber 18, with the tool chamber 18 positioned on top of the build chamber. The tool chamber 18 houses multiple tools, in a tool rack 22, including, but not limited to, selectable print heads 24. The 3D printer 10 includes a print head carriage 26 which connects or couples to a selected tool or print head, with an x-y gantry 28 moving the carriage 26 and a selected print head or tool in an x-y plane above a build plane within the heated build chamber 16. The build plane is provided by a platen or platen assembly 30 (shown in FIGS. 4 and 5) within the heated build chamber 16, with the platen 30 being moved in a vertical z direction within the build chamber by a platen gantry 32, typically four independently controllable linear actuators. The unheated tool chamber 18 and the heated build chamber 16 are separated by a thermal insulator 20 which minimizes heat loss from the heated build chamber 16 into the unheated tool chamber 18.

The thermal insulator 20 can be a deformable thermal insulator which allows x-y movement of the print head 24 across the build space. An example of a deformable thermal insulator 20 is disclosed in Stratasys U.S. Pat. No. 7,297, 304. The thermal insulator 20 allows the build environment to be maintained an elevated temperature while preventing the same elevated temperature in tool chamber 18. Retaining the electronic components of the print head 24 or other tool outside of the heated build chamber 16 can extend the life of the print head 24 or other tool as typically, the electronic portions of the print head 24 or other tool cannot survive the elevated temperature of the build environment. Maintaining a lower temperature in the tool chamber 18 also aids in extending the life of moving parts, such as the XY gantries, other electric motors or actuators and/or bearings.

Referring to FIGS. 2 and 3, the thermal insulator 20 of 3D printer 10 is illustrated as comprising accordion pleated y-direction thermal insulators 20A and x-direction thermal insulators 23. Referring to FIG. 4, the thermal insulator 20 of 3D printer 10 is illustrated as comprising roller thermal insulators. In either embodiment, the x-direction and y-direction thermal insulators comprise the ceiling of the heated build chamber 16. The y-direction thermal insulators 20A are connected to opposing outer surfaces of a X-bridge 60, such that as the X-bridge 60 is moved in a y-direction by an x-y gantry 28, one thermal insulator expands and the other thermal insulator contracts.

As best shown in FIG. 3, the x-direction thermal insulators 23 are seated in a tray 31 that may optionally support the X-bridge 60 or be supported by the X-bridge 60. Alternatively, in some embodiments the tray 31 is integral with the X-bridge 60. Also seated in tray 31 is a tool tray 101, which is coupled to or integral with the print head carriage 26 and carries an active print head 24, and also is coupled to and positioned between the x-direction thermal insulators 23. The tool tray 101 reciprocates in the x-direction as the x-y gantry 28 moves the print head 24 (e.g., indirectly by moving the print head carriage 60 or the tool tray 101), and the x-direction thermal insulators 23 on either side of the tool tray 101 move back and forth and deform accordingly to maintain the thermal insulation between chambers. The tool tray 101 further houses a thermal barrier 100A positioned over an access port to the build chamber (the "tool port") The thermal barrier 100A includes an aperture 106 that provides access for a tool or the print head 24 to enter into the heated build chamber 16 while minimizing heat loss.

In an exemplary embodiment of the 3D printer 10, the print head 24 is shown engaged on a tool mount of the carriage outside of the heated build chamber 16, and has an inlet 29 for receiving a consumable build material and a nozzle 25 for dispensing the build material onto the platform in a flowable state. The consumable build material can be provided to the print head 24 from one or more filament spools positioned within spool cabinets 56 positioned on the sides of the build chamber, and through filament guide tubes 54 extending from the spool cabinets to the print head.

Referring to FIGS. 2 and 4, the x-y gantry 28 is mounted on top of and outside of the heated build chamber 16, and in an exemplary embodiment comprises the X-bridge 60, Y-rails 52, and associated X and Y motors for moving and positioning the carriage 26 (and any build tool installed on the carriage) in an x-y plane above the build plane. The carriage d includes a tool mount 27 for receiving and retaining print heads 24 or other tools and a local Z positioner 72 for controllably moving a retained print head or other tool out of the x-y build plane along a perpendicular z direction axis. The local Z positioner operates to move a retained print head in a limited Z band of motion from a build position within the heated build chamber, to a tool change position in the tool rack 22. In some embodiments, the local Z positioner 72 may be utilized while the carriage is moving in x-y or when it is in a fixed x-y position. The x-y gantry, as well as the local Z positioner, can utilize any suitable motors, actuators or systems to move the carriage and print head or other tool in the x, y and z directions as discussed.

The tool rack 22 is located above the heated build chamber 16 at a position reachable by the tool mount 27 when elevated by the local Z positioner 72. The tool mount 27 may engage with and support a print head 24, and is used to retain and swap print heads provided in the rack, and once put into service, the hot end with the nozzle 25 is positioned into the heated print chamber 16, while the x-y gantry and print head electronics remain outside the heated build chamber 16. In general, any modular tools, such as print heads or any other tools that are removably and replaceably connectable to a 3D printer may be stored in bins of a tool rack for managing tool inventory and interchanging tools during operation of the 3D printer. The local Z positioner 72 is utilized for picking and placing tools in the bins so that the 3D printer 10 can interchangeably use the various modular tools contained in the tool rack 22. The tool rack 22 may be any suitable combination of containers or other defined spaces for receiving and storing tools.

The 3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to the 3D printer 10.

Controller assembly 38 may communicate over communication line 44 with print head 24, filament drive mechanisms, chamber 16 (e.g., with a heating unit for chamber 16), head carriage 26, motors for platen gantry 32 and x-y or head gantry 28, motors for local Z positioner 72, motors for the roller thermal insulator 20 and various sensors, calibration devices, display devices, and/or user input devices. In some embodiments, controller assembly 38 may also communicate with one or more of the platen 30, platen gantry 32, x-y or head gantry 28, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined z height within the heated build chamber 16. Controller assembly 38 may then direct x-y gantry 28 to move head carriage 26 (and the retained print head 24) around in the horizontal x-y plane above chamber 16, and direct the local Z positioner 72 to move the head carriage in the z direction relative to the x-y plane, in addition to the platen gantry z movement. Controller assembly 38 may also direct a retained print head 24 to selectively advance successive segments of the consumable filaments from consumable spools 50 through filament guide tubes 54 and into the print head 24. It should be noted that movements commanded by the controller assembly 38 may be directed serially or in parallel. That is, the print head 24 can be controlled to move along the x, y and z axes by simultaneous directing the x-y gantry 28 and the local Z positioner 72 to re-position the head carriage 26 along each axis.

Figure 5:
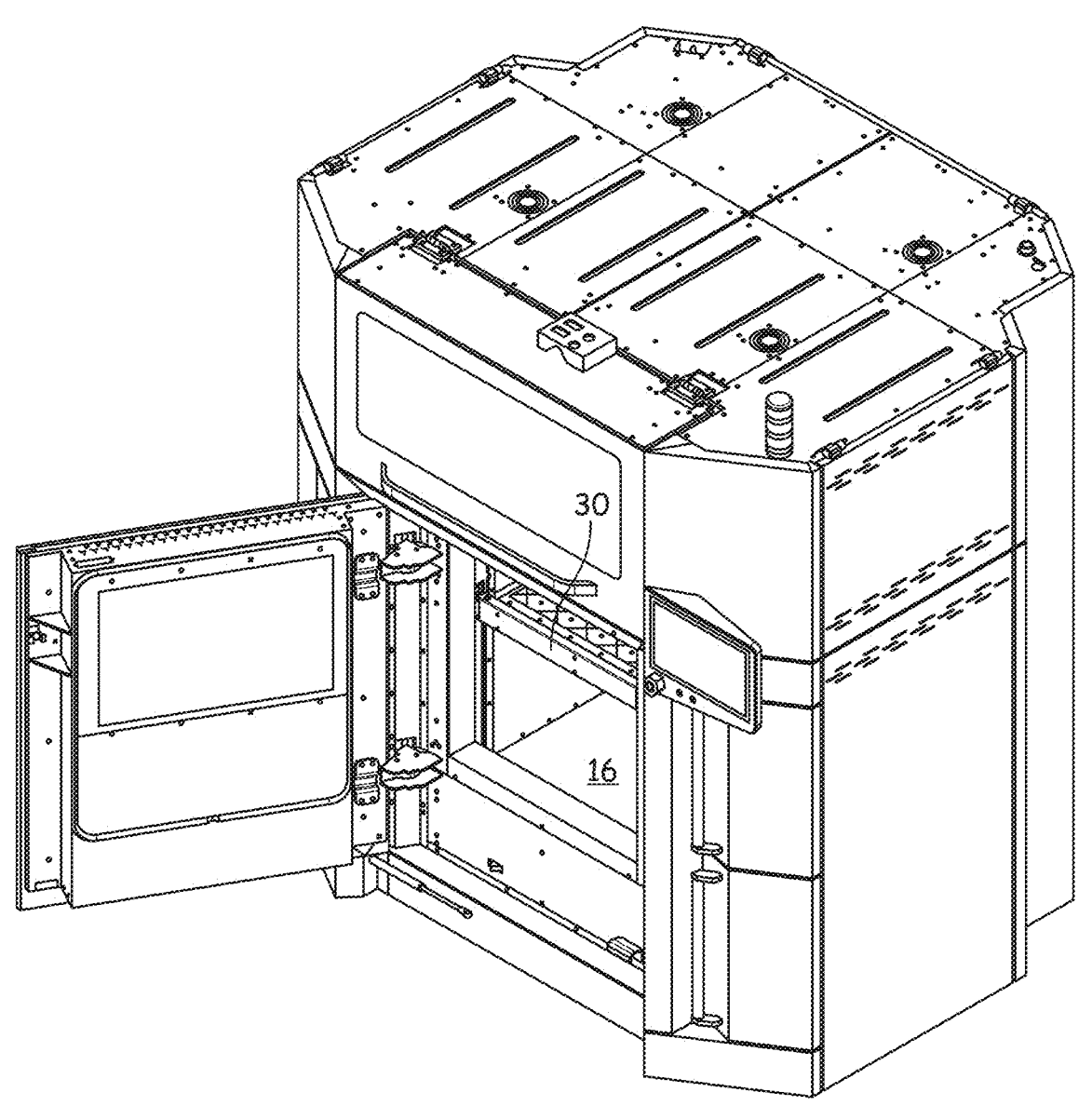
FIG. 5 is a view of the 3D printer with a door open to the heated build chamber.

At the start of a build process, the build plane is typically at a top surface of the build platform or platen 30 (or a top surface of a build substrate mounted to the platen) as shown in FIG. 5, where the platen 30 is positioned to receive an extruded material from the nozzle 25 of the print head 24. The start of a build process begins with the platen 30 proximate a top region of the heated build chamber 16. As layers are printed, the platen 30 is indexed away from the build plane, allowing printing of a next layer in the build plane. The platen gantry 32, or primary Z positioner, moves the build platform away from the print plane in between the printing of layers of a 3D fabricated part 74 (shown in FIG. 4). One or more parts and associated support structures can be printed in a layer-by-layer manner by incrementally lowering the platen in the z direction. FIG. 4 illustrates portions of 3D printer 10 with the platen 30 at a lowered position, achieved through numerous incremental z direction repositioning steps while printing.

As discussed, the build chamber 16 of the 3D printer may be heated to provide a heated or ovenized build environment, such as in the case of FDM® 3D printers manufactured and sold by Stratasys, Inc. of Eden Prairie, MN. The heated build chamber 16 is provided to mitigate thermal stresses, or to anneal the part, and other difficulties that arise from the thermal expansion and contraction of layered build materials during fabrication of a layered part, using methods such as are disclosed in U.S. Pat. No. 5,866,058. The thermal management system of the present disclosure aids in retaining heat within the heated build chamber 16 by providing thermal insulators to increase thermal retention as the x-y gantry moves the print head 24 or tool and a penetrable thermal barrier over the tool port.

Print heads, or tools need an access point aka tool port into the oven for the hot end to be inserted into the heated build chamber 16 during the printing operation. The tool working end can be a round heated tube or barrel, although it may also be in other geometries such as rectangular, triangular, oval, and the like. A flexible and accommodating thermal barrier flexes as the print head or tool is inserted into the heated build chamber 16, and conforms to the exterior surface of the print head hot end. The thermal barrier is sufficiently resilient to return to its unflexed position when the print head is removed from the tool port, in order to minimize heat loss from the gap about the outside perimeter of the inserted tool at the access point to the heated build chamber 16.

Figure 6:
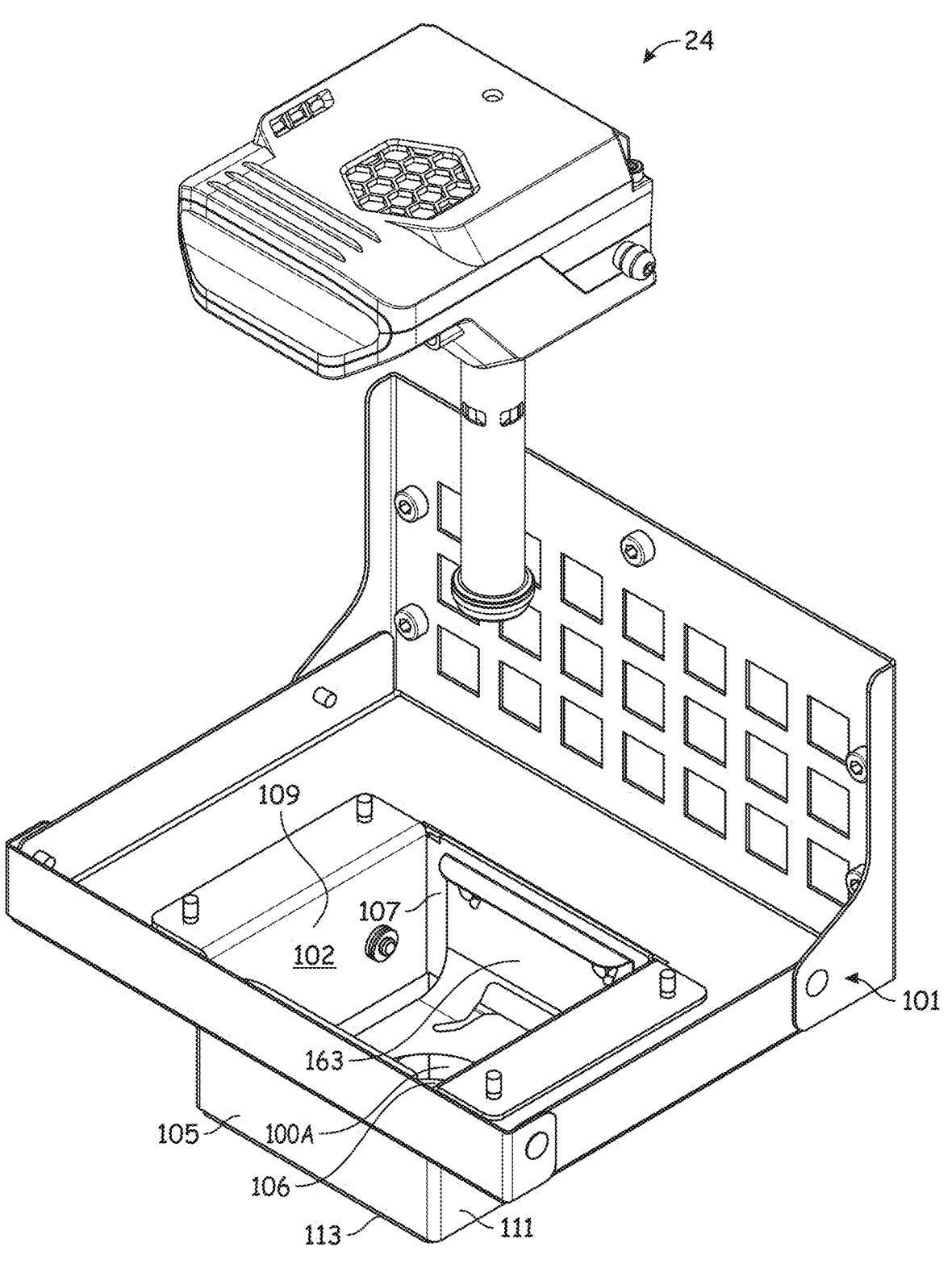
FIG. 6 is a view a print head and a tool tray with a thermal barrier having a tool port for passing the print head therethrough.
Figure 7:
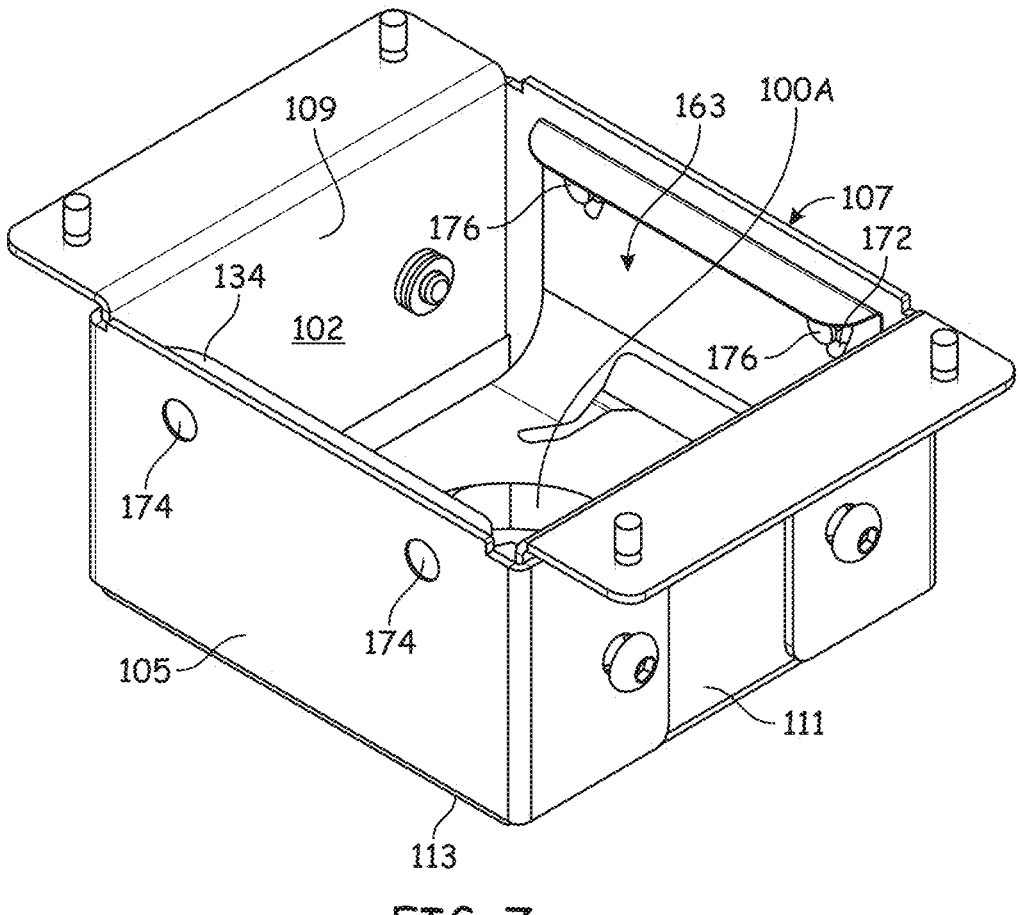
FIG. 7 is another plan view of a portion of the tool tray with the thermal barrier for passing the tool therethrough.

Referring to FIGS. 6 and 7, a thermal barrier 100A is located within the tool tray 101. The tool tray 101 is upward facing and includes an opening 102 in the top that leads to a space defined by a front wall 105, a back wall 107, a left side wall 109 and a right side wall 111. A bottom surface 113 providing a tool port attaches to the front wall 105, the back wall 107, the left side wall 109 and the right side wall 111. The thermal barrier 100A is supported on the bottom surface 113 covering the tool port, where its aperture 106 allows entry to the build chamber.

Figure 8:
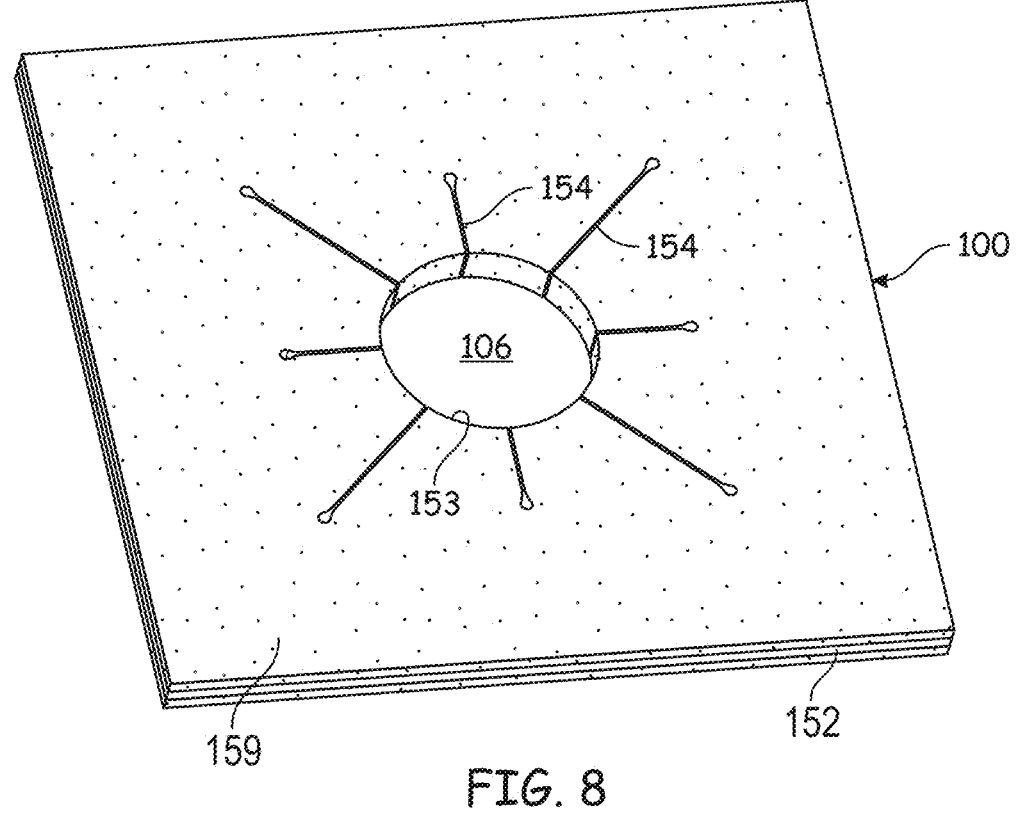
FIG. 8 is a plan view of the thermal barrier having a low surface energy coating.

Referring to FIGS. 6-10, thermal barriers 100, 100A include a complementary configuration to that of the bottom wall 113. In one embodiment, the thermal barrier 100 is fabricated from one solid material. In another embodiment, the thermal barrier 100 is coated with a low surface energy material 159 that is substantially abrasion resistant, such as shown in FIG. 8. The thermal barrier material 100 can be an elastomeric composition, in order to allow deformation and conformance to the surfaces of the tool when the tool is inserted into the access port, and to return to its original shape once the working end of the tool passes through and when the tool is removed from the access port. The material of the thermal barrier 100 can also be heat tolerant and abrasion resistant through the aperture.

Figure 9:
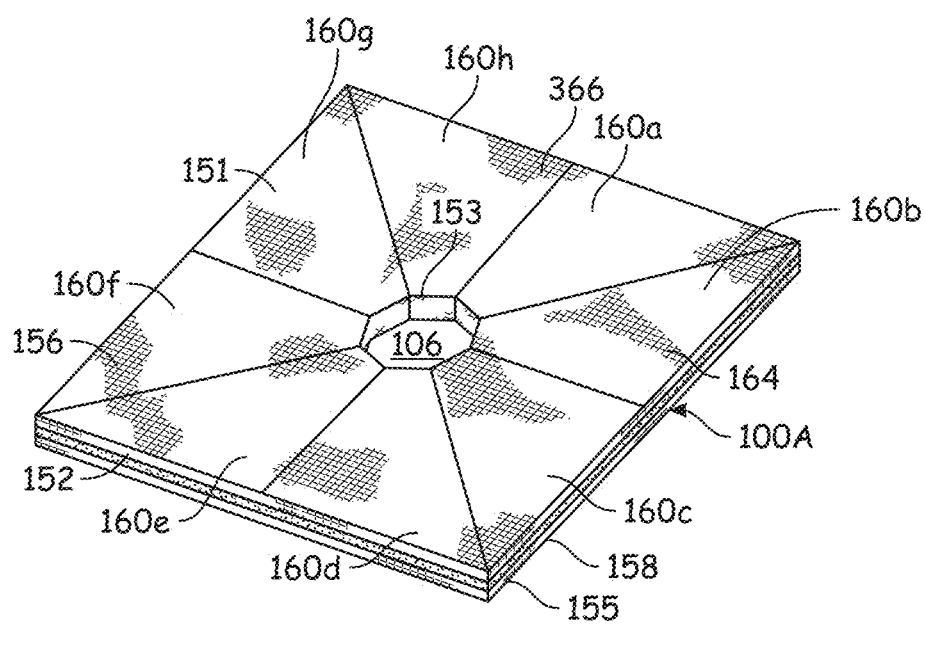
FIG. 9 is a plan view of a multi-layer thermal barrier for passing the tool therethrough.
Figure 10:
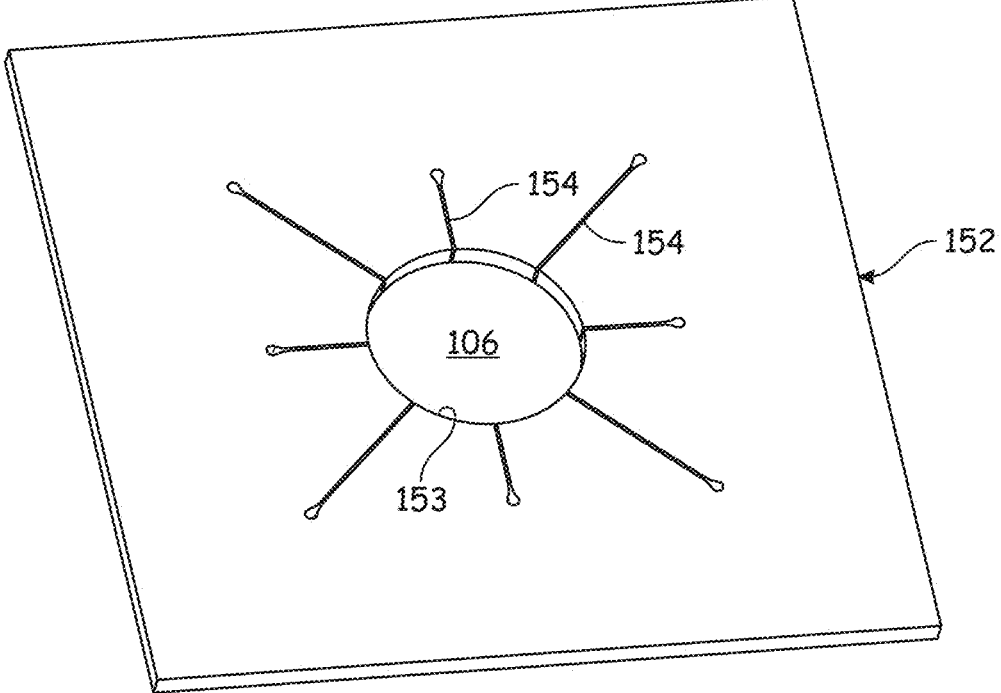
FIG. 10 is a plan view of the inner flexible layer of the multi-layer thermal barrier.

In some embodiments as illustrated in FIGS. 9 and 10, the thermal barrier 100A is a multi-layer material construction where the thermal barrier 100A includes a flexible inner layer 152 that includes the aperture 106. The flexible inner layer 152 includes a plurality of slits 154 that are substantially uniformly spaced into the flexible inner layer 152 in a radial direction. In an exemplary, non-limiting example, the flexible inner layer 152 includes eight substantially uniformly spaced slits 154 extending from a perimeter 153 of the aperture 106, in order to accommodate a cylindrical tool shaft as best illustrated in FIG. 3.

An exemplary, non-limiting example the inner layer 152 is a silicone rubber material having a Shore A hardness ranging from less than 70 Shore A hardness and greater than 15 Shore A hardness and more particularly in the range about 50 Shore A hardness and about 70 Shore A hardness. However, other elastomeric materials such as unsaturated or saturated rubbers, and other various 4S elastomers may also be used. Unsaturated rubbers are materials such as polyisoprene, isoprene, butadiene, styrene-butadiene, and nitrile rubbers. Examples of saturated rubbers include EPM and EPDM rubber, Epichlorohydrin rubber, silicone rubber, fluorosilicone rubber, fluoroelastomers, perfluoroelastomers, polyether block amides, chlorosulfonated polyethylene, and ethylene-vinyl acetate rubbers. Other elastomer examples are thermoplastic elastomers (TPE), the proteins resilin and elastin, polysulfide rubber, elastolefin, and polydichlorophosphazene rubber. These are also within the scope of the present disclosure, and selection is based in part on the heat tolerance requirements needed.

In some embodiments, the thermal barrier 150A includes upper and lower layers 356 and 358 that are connected with material extending through and about a perimeter 153 of the aperture 106. The upper and lower layers 156 and 158 include a plurality of discrete units 160a-h that are secured to the flexible inner layer 152 such that the upper and lower layers 156 and 158 substantially cover an upper surface 151, a lower surface 155 and the perimeter 153 of the aperture 106. The discrete units 160a-h of the upper and lower layers 156 and 158 individually pass through the aperture 106 and are secured to the flexible inner layer 152 so that the discrete units 160*a-h* line the perimeter 153 of the aperture 106. The lined perimeter allows the tool to pass therethrough which in turn protects the flexible inner layer 152 material from wear. When secured to the flexible inner layer 152, the plurality of discrete units 160*a-h* are adjacent each other and allows portions between the slits 154 of the flexible inner layer 152 to move as the tool is positioned through the aperture 106. The plurality of discrete units 160*a-h* form the upper layer 156 and the lower layer 158 of the thermal barrier 1000A as well as forming the lining about the aperture 106.

An exemplary material of construction of the upper and lower layers 156 and 158, as well as the perimeter 153 of the aperture 106, is a PTFE coated fiberglass material. The PTFE coated fiberglass material has a low surface energy that allows the tool to pass through the aperture 206 while being sufficiently tough to allow numerous tools to cycle through the thermal barrier 350 for the tool in the Z direction. Additionally, covering the perimeter 153 of the aperture 106 with the PTFE coated fiberglass material prevents the tool from engaging the material of the inner layer 152 which can cause erosion of the material of the inner flexible layer 152.

The discrete units 160*a-h* can be secured with any suitable securing mechanism including but not limited to, a plurality of staples, an adhesive or glue capable of withstanding elevated temperatures in the heated build chamber 16, rivets and stitching.

In other embodiments, the flexible inner layer 152 is substantially covered with a low surface energy and sufficiently tough material to form the upper and lower layers 159, as best illustrated in FIG. 8. The upper and lower layers can include an applied liquid coating which is subsequently cured, or can also be adhered in some fashion to the flexible inner layer 152 using a tie layer of material different from the flexible inner layer 152 of material.

Figure 11:
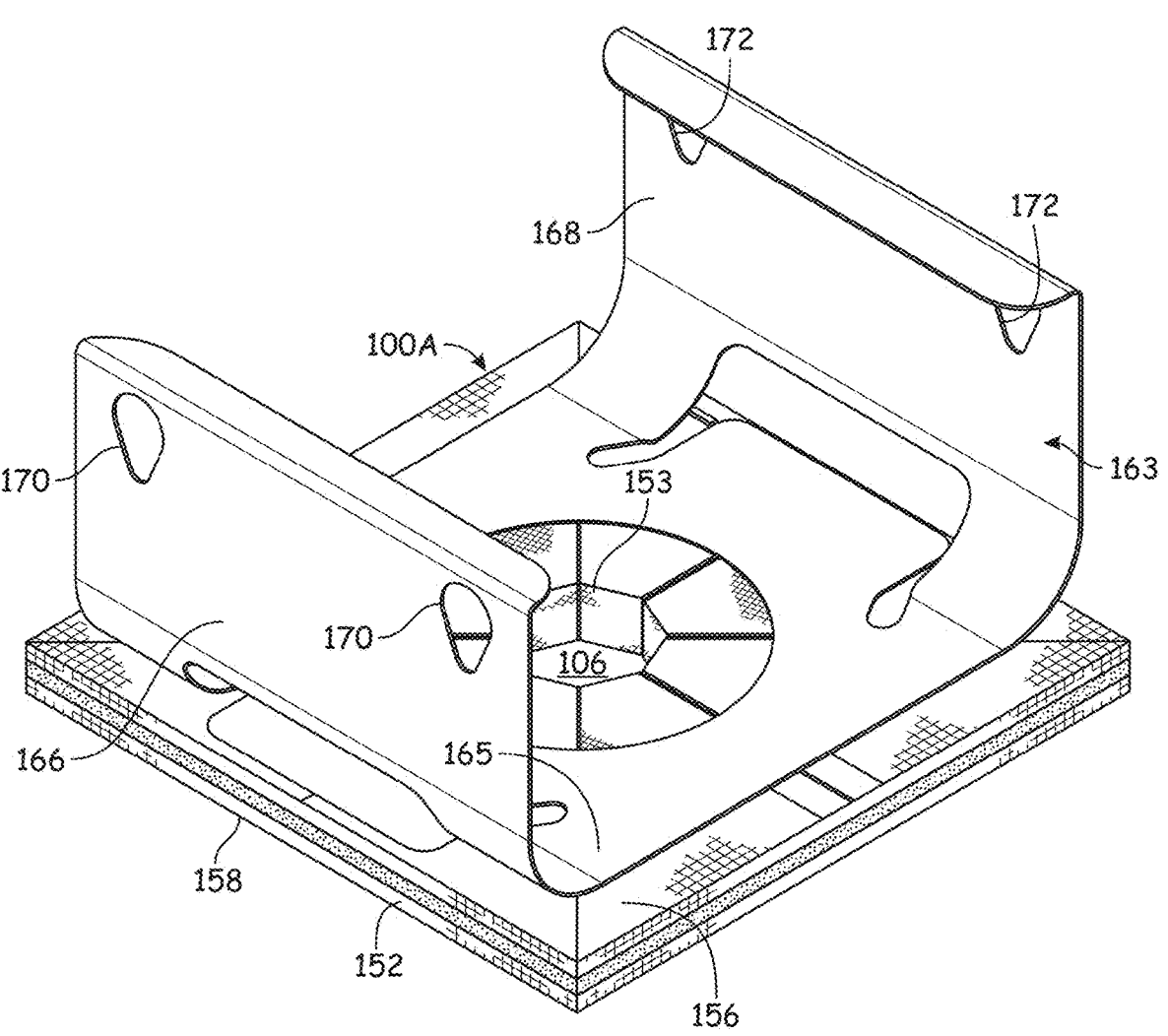
FIG. 11 is a plan view of a clamping device retaining the thermal barrier within the tool port.

Referring to FIGS. 6, 7 and 11, a clamping device 163 retains the thermal barrier 100A in a substantially fixed position within the tool tray 101. The clamping device 163 is constructed of a flexible, resilient material such as sheet metal, where the clamping device 163 includes a bottom portion 165 with a substantially flat configuration that is configured to engage the upper layer 156 of the thermal barrier 150. The bottom portion 164 includes an aperture that spans a portion of the slits 154 and the seams 162 such that the aperture 106 can expand as the tool passes through the aperture 106 and return to a substantially flat configuration once the wider portion of the tool passes through the aperture 106, where the aperture 106 is proximate a portion of the tool having the working end in the heated build chamber 16.

The clamping device 163 includes front and back side walls 166 and 168 that both include elongated apertures 170 and 172 that are configured to accept pegs 174 and 176 extending from the front and back walls 105 and 107. When the pegs 174 and 176 are positioned within the elongated apertures 170 and 172, a downward force is placed on the bottom portion 164 which securely retains the thermal barrier 100A for the tool within the tool tray 101. While the clamping device 163 is described and illustrated, other attaching mechanisms are within the scope of the present disclosure including, but not limited to, screws, clips, binders, cammed clamping mechanisms and combinations thereof.

With the thermal barrier 100, 100A for the tool retained within the tool tray 101 with the clamping device 363, a tool can be inserted through the aperture 106 in the thermal barrier 100, 100A where the aperture 106 can be expanded in diameter by forcing the material between the plurality of slits 154 downward in the Z direction. Once a wider portion of the tool is through the aperture 106, the material between the plurality of slits 154 returns to a substantially flat configuration where the perimeter 153 that is covered by the material of the upper and lower layers 156 and 158 is proximate the tool and substantially prevents heated air from leaking about the aperture 103 and the tool.

Figure 12:
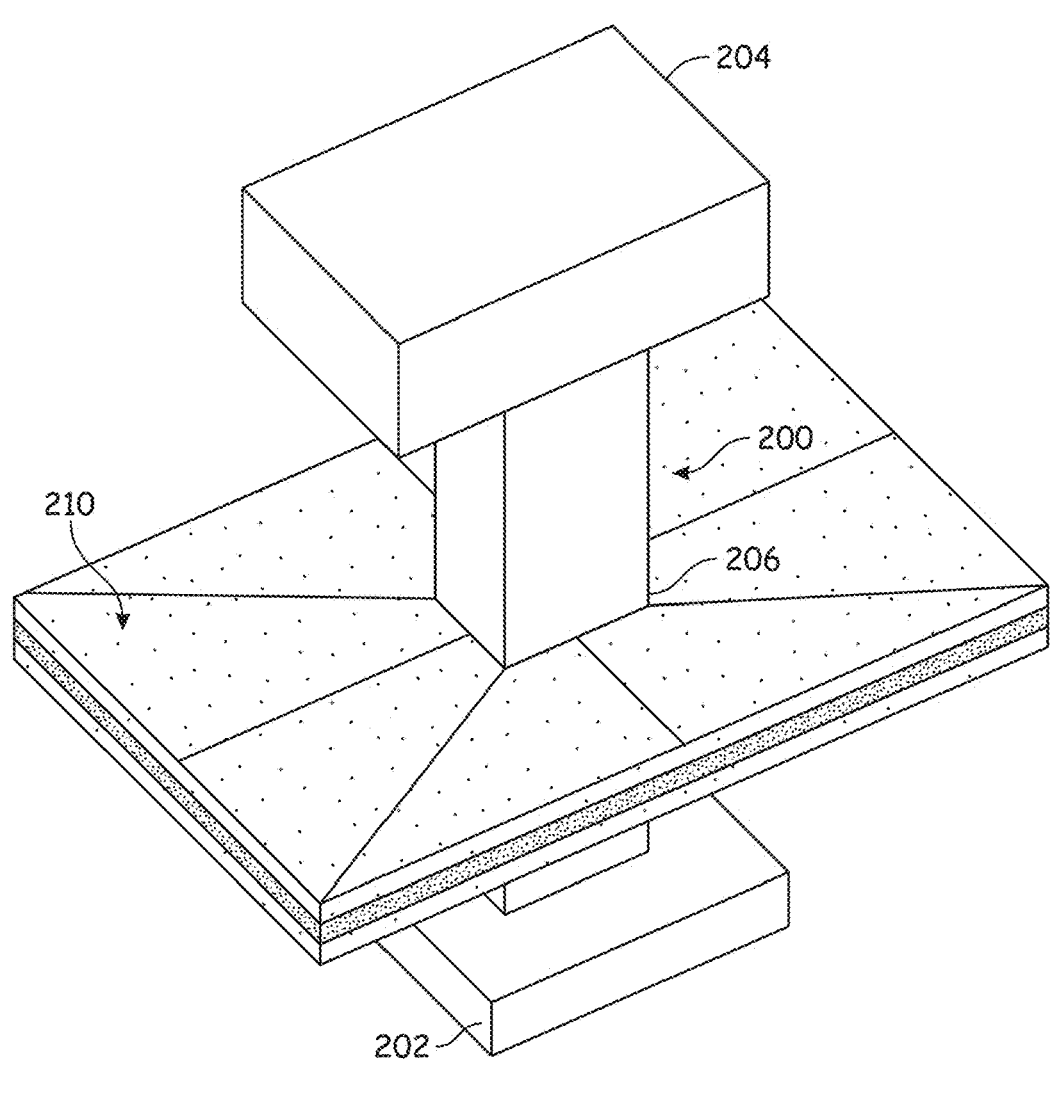
FIG. 12 is a view of a generic tool carrying a thermal barrier.
Figure 13:
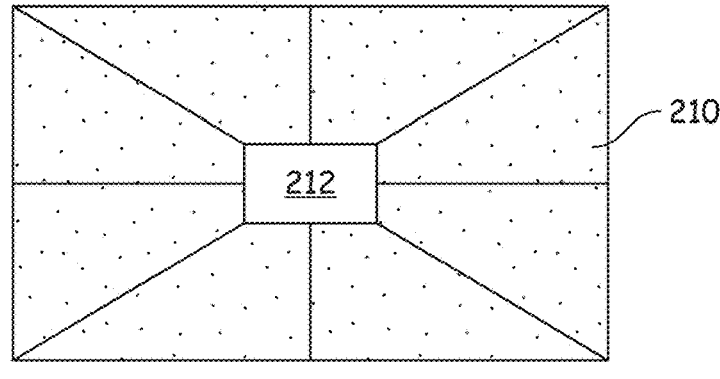
FIG. 13 is a top view of a thermal barrier for a tool with a rectangular aperture.

Referring to FIGS. 12 and 13, in other embodiments, a generic tool 200 is illustrated that includes a working end 202 and a top end 204 connected with a connecting portion 406. The connecting portion 206 includes a substantially square or rectangular cross section. The generic tool 200 carries a thermal barrier 210 that includes a similar construction and that of the thermal barrier 100A. However, an aperture 212 is rectangular to accommodate the connecting portion 206. The thermal barrier 210 is carried on the generic tool 200 and is positioned in the tool tray 101 to form a seal as the tool 200 is used in the heated build chamber 16.

Figure 14:
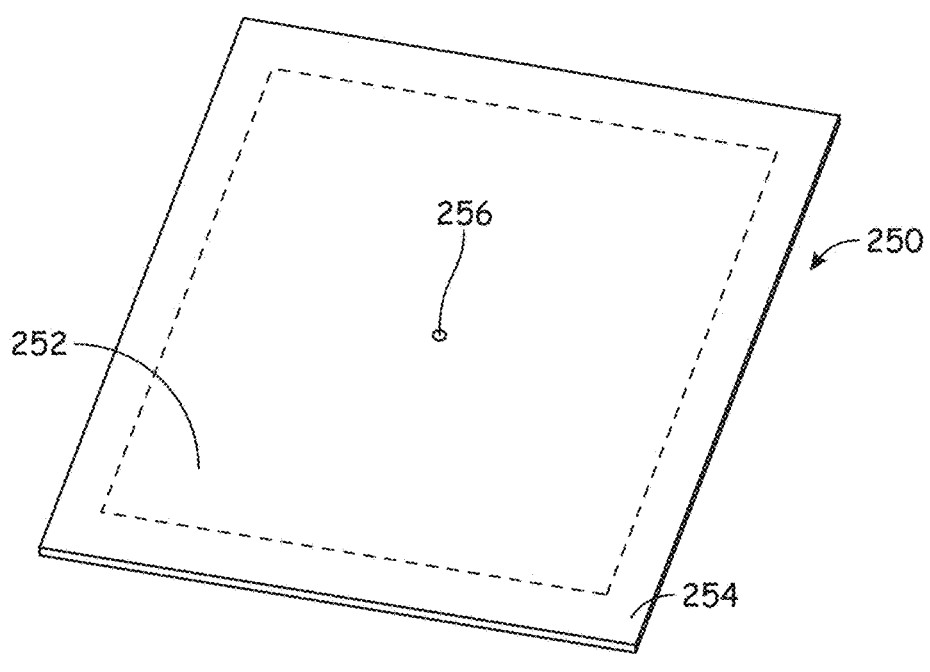
FIG. 14 is a view of a membrane thermal barrier for a tool.
Figure 15:
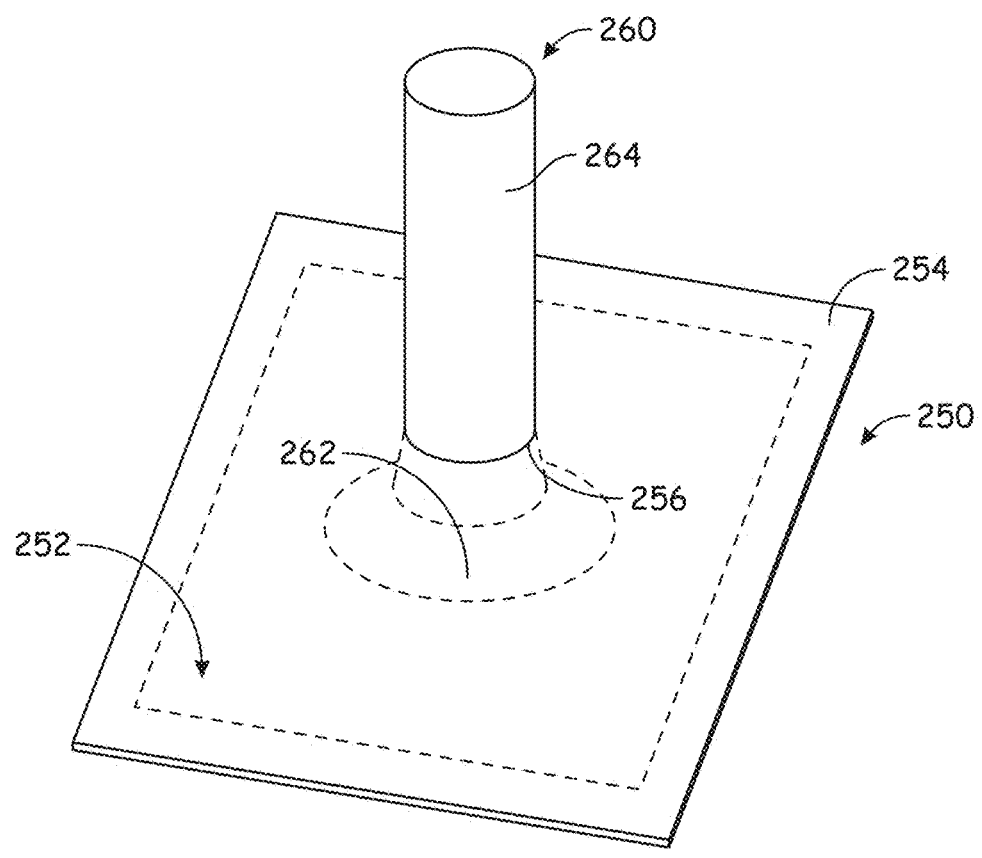
FIG. 15 is a view of the membrane thermal barrier sealed about a liquefier tube of a print head.

Referring to FIGS. 14 and 15, another thermal barrier is illustrated at 250 that is positioned within the tool tray 101 with the clamping device 163 or other retaining mechanism. The thermal barrier 250 includes a membrane 252 that is retained to a frame 254 proximate a perimeter of the membrane 252 and holds the membrane 252 in tension.

The membrane 252 includes an aperture 256 that is constricted relative to a size of an extrusion end 262 of a print head 260. As the extrusion end 262 of the print head 260 engages the membrane 252, the aperture 256 expands to allow the extrusion end 262 to pass therethrough. After the extrusion end 262 passes through the membrane 252, the aperture 256 contracts and forms a seal about a liquefier tube portion 264 of the print head 260. The seal substantially reduces leakage of heated air from the heated build chamber between the thermal barrier 250 and the liquefier tube portion 264. The membrane 252 is constructed of an elastomeric or rubberized polymeric material that is capable of withstanding elevated temperatures, such as above 200° C., while being sufficiently deformable to allow the working end of a tool to pass therethrough without.

Figure 16:
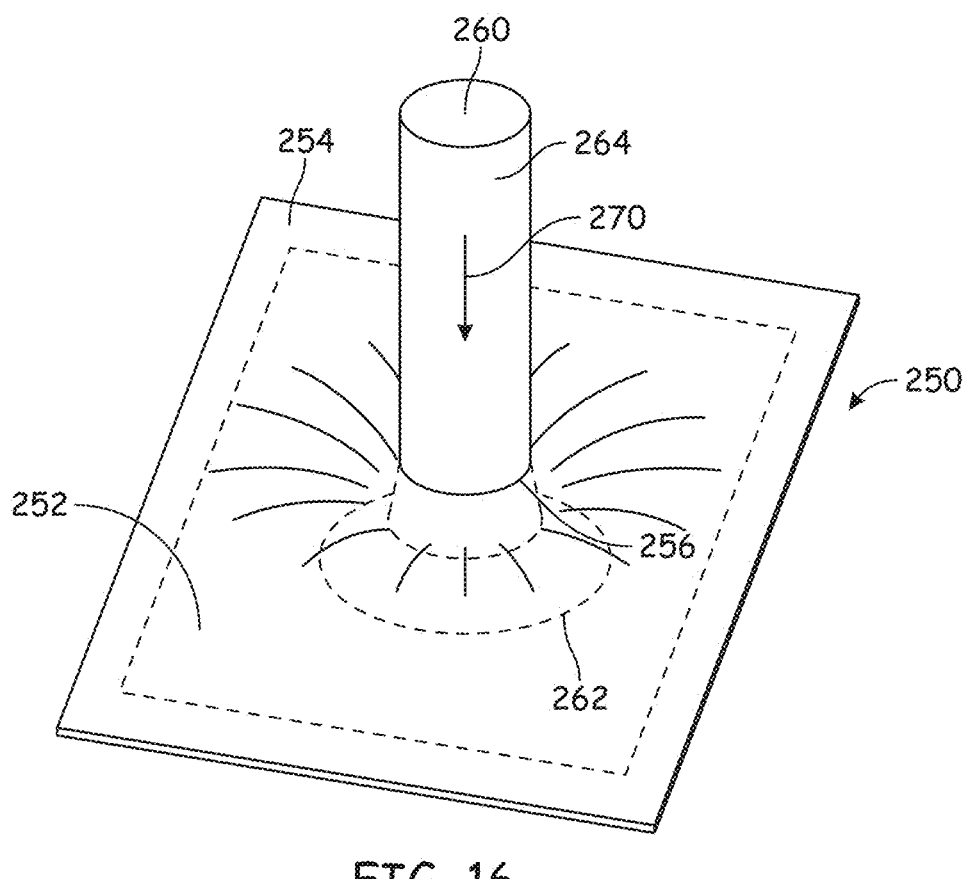
FIG. 16 is a view of the membrane thermal barrier elongated in a first z direction.

Referring to FIGS. 16 and 17, as the print head 260 moves in the Z direction in the direction of arrow 270, the membrane 252 elongates in the Z direction while the seal remains substantially in the same location. As the print head 260 continues to move in the Z direction, the membrane 252 reaches an elastic limit and can no longer continue to elongate. Continued movement of the print head 260 in the Z direction in the direction of arrow 270 causes the liquefier tube portion 264 to slide relative to the membrane 252 while maintaining the seal about the liquefier tube portion 264.

As the print head 260 moves in the Z direction in the opposite the direction of arrow 270, the membrane 252 remains in substantially a same location on the liquefier tube portion 264 while maintaining the seal. The membrane 252 contracts from the conical configuration in FIG. 16 to substantially flat and to an inverse conical configuration. Once the elastic limit of the membrane 252 is reached, continued movement of the print head 460 in the Z direction in the upward direction causes the liquefier tube portion 264 to slide relative to the membrane 252 while maintaining the seal.

As the print head 260 continues to move in the Z direction in the upward direction, the extrusion end 262 engages and passes through the aperture 256 such that the print head 260 is disengaged or spaced from the membrane 252. With the print head 260 disengaged from the membrane 252, the aperture 256 constricts to a relaxed state, which minimizes the opening through which heated air can escape through the thermal barrier 250, as best illustrated in FIG. 14.

The thermal barriers 100, 100A, 200 and 250 all minimize leakage of hot air from the heated build chamber into the tool chamber while a print head or tool is in use in the heated chamber. The thermal barriers 100, 100A and 250 also minimize the leakage of air from the heat build chamber as one tool is swapped for another tool by reducing the open area in the thermal barriers 100, 100A and 250 relative to the open area in the opening of the bottom wall 113.

When the overall printer configuration has an unheated tool chamber above the ceiling of the heated print chamber, there is a strong potential to overheat the unheated print tool chamber to unacceptable temperatures. During the printing of a part in a heated chamber, the oven temperature often may exceed temperatures of 200° C. Sensitive electronic portions of each print head tool are kept outside the heated print chamber to attempt to maintain heat exposure to below a threshold of 80° C. When a tool port is left uncovered (e.g., by removing the thermal barrier) hot air can flow freely from the heated chamber into the tool chamber during a tool swap, and as a result the temperature in the unheated tool chamber has been observed exceed the 80 C threshold when operating without the thermal barrier. The use of a thermal barrier of the present disclosure minimizes the tool port opening which aids in retaining heat in the heated build chamber as the print heads are swapped, which in turn aids in retaining the unheated tool chamber below the 80° C. threshold.

Although the present disclosure may have been described with reference to preferred embodiments, workers skilled in the art will recognize that changes may be made in form and detail without departing from the spirit and scope of the disclosure.

The invention claimed is:

1. A 3D printer comprising:
   an enclosed build chamber having a ceiling comprised of a y-axis deformable thermal insulator and through which an active print head accesses the build chamber to print parts by extruding material onto a platen;
   an x-y gantry mounted on top of the build chamber and comprising an x-bridge spanning the build chamber;
   a print head carriage providing a tool mount for removable installation of one or more print heads and configured for back-and-forth movement along the x-bridge, wherein the x-y gantry is configured to move the carriage in an x-y plane above the build chamber;
   an upward-facing tool tray coupled to or integral with the carriage and having an open bottom providing a tool port for accessing the build chamber;
   an x-axis deformable thermal insulator spanning a length of the x-bridge and coupled to opposite ends of the tray and or the carriage so as to expand and contract with the back-and-forth movement of the carriage along the x-bridge, the x-axis deformable thermal insulator thereby covering a portion of the build chamber and forming part of the ceiling; and
   a thermal barrier mounted in the tool tray and covering the tool port and penetrable through an aperture thereof, the aperture providing an entry point to the build chamber for a working end of the active print head, wherein when the working end is positioned though the aperture, the tool port is substantially closed.

2. The 3D printer of claim 1, wherein the aperture has a geometry complimentary to a portion of a print head above the working end wherein the thermal barrier is configured to deform when the working end of the print head penetrates the thermal barrier and to return to a substantially-closed resting state thereafter and once the working end is removed from the aperture, the aperture contracts to limit an area through which heat can escape the build chamber.

3. The 3D printer of claim 2, wherein the x-axis deformable thermal insulator and the y-axis thermal insulators are each selected from a roller-style insulator, a baffle-style insulator.

4. The 3D printer of claim 1, wherein the y-axis deformable insulator comprises two components, each component coupled to the x-bridge on an opposite longitudinal edge thereof so as to expand and contract with movement of the x-bridge in a y-direction.

5. The 3D printer of claim 1, wherein the thermal barrier comprises an elastic membrane and the aperture stretches and clings to a perimeter of the working end of the active print head.

6. The 3D printer of claim 5, wherein the thermal barrier has a layered construction.

7. The 3D printer of claim 1, wherein the aperture of the thermal barrier is perforated, having at least four substantially uniform spaced slits radially extending about a perimeter thereof.

8. The 3D printer of claim 1, wherein the thermal barrier comprises:
   a flexible and resilient middle portion having an upper surface and a lower surface with the aperture;
   an upper layer of material adjacent the upper surface; and
   a lower layer of material adjacent the lower surface wherein the upper layer and the lower layer are joined by material extending about a perimeter of the aperture, wherein the material is configured to aid the working end of the active print head to pass through the aperture and prevent wear of the flexible and resilient middle portion.

9. The 3D printer of claim 8, wherein the flexible and resilient middle portion of the thermal barrier comprises substantially uniformly spaced slits radially extend from the aperture into the middle portion.

10. The 3D printer of claim 8, wherein the upper layer of material and the lower layer of material of the thermal barrier comprises the plurality of discrete units that are adjacent each other and allows portion between the slits of the flexible and resilient middle portion to move as the tool is positioned through the aperture.

11. The 3D printer of claim 8, wherein the upper and lower layers of material are coated onto the upper and lower surface of the flexible and resilient middle portion.

12. The 3D printer of claim 1, wherein the aperture is substantially circular.

13. The 3D printer of claim 1, wherein the aperture is substantially polygonal.

14. The 3D printer of claim 1, wherein the thermal barrier is configured to be removably retained within the upward-facing tool tray.

15. The 3D printer of claim 14, and further comprising a clamping member configured to removably retain the thermal barrier within the upward-facing tool tray.

16. A method of swapping print heads during a build job in a 3D printer that extrudes material into a build chamber, the method comprising:
   providing an x-y gantry mounted on top of the build chamber and comprising an x-bridge spanning the build chamber, a print head carriage providing a tool mount for removable installation of one or more print heads and configured for back-and-forth movement along the x-bridge, wherein the x-y gantry is configured to move the carriage in an x-y plane above the build chamber, an upward-facing tool tray coupled to or integral with the carriage and having an open bottom providing a tool port for accessing the build chamber, an x-axis deformable thermal insulator spanning a length of the x-bridge and coupled to opposite ends of the tray and or the carriage so as to expand and contract with the back-and-forth movement of the carriage along the x-bridge, the x-axis deformable thermal insulator thereby covering a portion of the build chamber and forming part of the ceiling, wherein the x-axis thermal barrier comprises an aperture configured to expand as a working end of a first print head passes therethrough and configured to contract about the print head once the working end passes through the thermal barrier;

moving the working end of the first print head through the thermal barrier, thereby causing the tool port to be substantially closed; and lifting the first print head from the heated build chamber by passing the working end through the thermal barrier and once the working end is removed from the aperture for a tool swap, the aperture contracts to an area that is less than a maximum cross-sectional area of the working end.

17. The method of claim 16, and further comprising printing at least a portion of a 3D part with the first print head while the working end is within the build chamber.

18. The method of claim 16 and further comprising:
swapping the first print head for a second print head;
moving a working end of the second print head through the thermal barrier thereby causing the tool port to be substantially closed; and
lifting the second print head from the heated build chamber by passing the working end through the thermal barrier and once the working end is removed from the aperture for a tool swap, the aperture contracts to an area that is less than a maximum cross-sectional area of the working end.

19. The method of claim 16, wherein providing the aperture within the thermal barrier comprises providing a multilayer thermal barrier having a flexible and resilient middle layer and upper and lower layers with low surface energy wherein the low surface energy material covers the aperture.

20. The method of claim 19, wherein the flexible and resilient middle portion of the thermal barrier comprises substantially uniformly spaced slits radially extend from the aperture into the middle portion.

21. The method of claim 20, wherein the upper layer of material and the lower layer of material of the thermal barrier comprises a plurality of portions having seams that align with the slits such that the aperture is configured to expand as a working end of a first print head passes therethrough and return to the substantially contracted, relaxed configuration about the first print head after the working end has passed through the aperture.

22. The method of claim 21, wherein the upper and lower layers are coated onto upper and lower surface of the flexible and resilient middle portion.

* * * * *